L. E. & J. M. MILLER & A. L. CARLTON.
EGG HOLDER AND CANDLER.
APPLICATION FILED DEC. 13, 1915.

1,193,285.

Patented Aug. 1, 1916.

Witnesses

Inventors
L. E. Miller,
J. M. Miller and
A. L. Carlton,
by
Attorneys

UNITED STATES PATENT OFFICE.

LEWIS E. MILLER, OF NEODESHA, JOHN MORTON MILLER, OF SALINA, AND ARTHUR L. CARLTON, OF BIRD CITY, KANSAS.

EGG HOLDER AND CANDLER.

1,193,285.      Specification of Letters Patent.      Patented Aug. 1, 1916.

Application filed December 13, 1915. Serial No. 66,582.

*To all whom it may concern:*

Be it known that we, LEWIS E. MILLER, JOHN MORTON MILLER, and ARTHUR L. CARLTON, citizens of the United States, residing, respectively, at Neodesha, Salina, and Bird City, in the counties of Wilson, Salina, and Cheyenne, State of Kansas, have invented a new and useful Egg Holder and Candler, of which the following is a specification.

The present invention appertains to egg holders and candlers, and aims to provide a novel and improved egg candler or tester, and an egg holder for placing the eggs upon the candler or tester, said holder being adapted to contain a quantity of eggs whereby they can be candled readily.

A more specific object of the invention is to provide an egg tester or candler having an apertured top plate over which the eggs are supported, in combination with illuminating means movable under said top plate whereby the rows of eggs can be illuminated in succession, whereby the unfertile or bad eggs can be detected.

It is also within the scope of the invention to provide a device of the nature indicated, which is comparatively simple and inexpensive in construction, as well as being convenient, practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in the accompanying drawing, wherein:—

Figure 1:
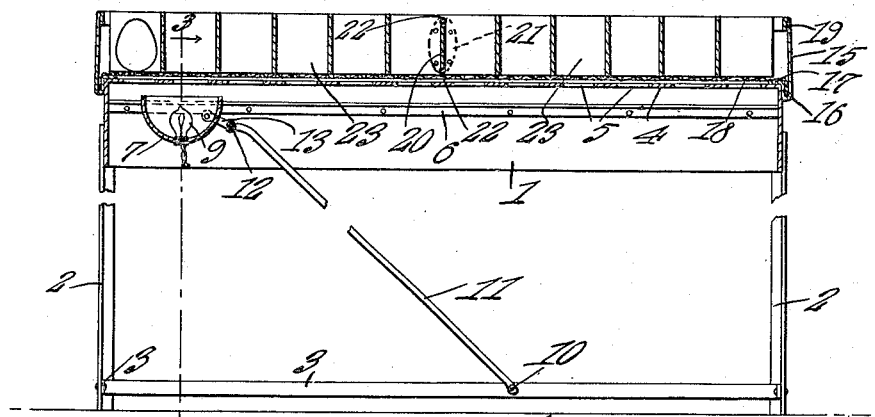
Figure 2:
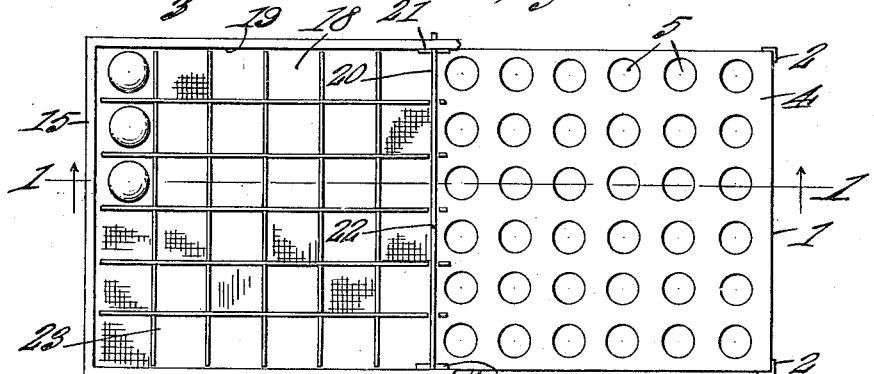
Figure 3:
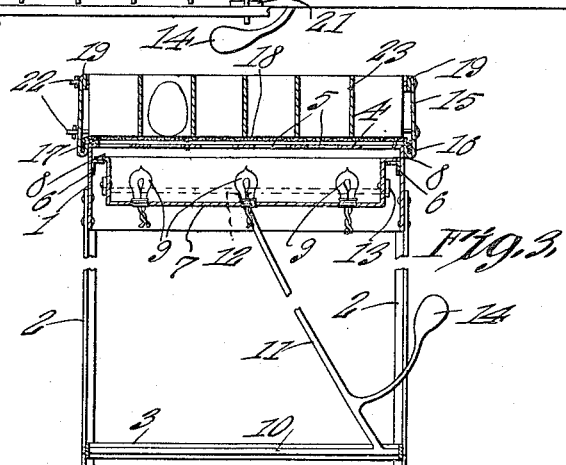

Figure 1 is a longitudinal vertical section taken on the line 1—1 of Fig. 2, parts being broken away. Fig. 2 is a plan view of the device, portions being broken away. Fig. 3 is a cross section taken on the line 3—3 of Fig. 1.

In carrying out the invention, the tester or candler embodies a rectangular frame 1 constructed of sheet metal or other suitable material, supported by angle iron legs 2, the upper ends of which are secured to the corners of the frame 1. The legs 2 are connected adjacent their lower ends by braces 3, and the upper edge of the frame 1 is provided with an opaque top plate 4 which is provided with suitably arranged rows of apertures 5.

Disposed within the frame 1 is a movable illuminating device, said device being carried by a pair of angle iron rails 6 secured interiorly to the side walls of the frame 1 longitudinally of the frame. A transverse semi-cylindrical or trough-shaped reflector 7 is disposed between the rails 6, and the ends of the reflector 7 are provided with upper flanges 8 overlapping the rails 6, to guide the reflector 7 for longitudinal movement. The interior of the reflector is polished or otherwise finished so that the light rays from the electric or other lamps 9 are reflected upwardly through the apertures 5. The lamps 9 are attached to the bottom of the reflector 7 and are supplied with current in any suitable manner.

The means for shifting or moving the reflector 7, embodies a transverse rock shaft 10 journaled to the side braces 5 between the ends of the frame, and having an upwardly extending arm 11 provided at its upper or free end with a transverse rod or T-head 12 whose ends are connected by links 13 with the ends of the reflector 7. The rod 12 is disposed at one side of the reflector parallel therewith, and the links 13 are pivoted to the ends of the rod 12 and reflector 7, whereby when the arm 11 is swung, the reflector is moved longitudinally under the top plate 4 so that the light rays will pass upwardly through the rows of apertures 5 in succession. The arm 11 has an outstanding handle 14 which can be readily grasped for swinging the arm to move the reflector. The frame is foreshortened in Figs. 1 and 3, since it is much higher than illustrated, the intermediate portions being broken away. Consequently, the fulcrum 10 will be farther remote from the rails 6, whereby the upper end of the arm 7 moves in an arc of relatively small height, and the links 13 permit of the vertical movement of the upper end of the arm 11 relative to the reflector. Said links are sufficiently long to permit of the up and down movement of the upper end of the arm as the arm is swung back and forth.

It is to be noted that the tester or candler is mounted upon a stand, whereby the tester or candler will be convenient in use.

The egg holder embodies a rectangular frame 15, constructed of sheet metal or other suitable material, and having its lower edge bent back or reflexed inwardly, as at 16, said reflexed or reëntrant portion 16 being provided with an inturned flange 17. A meshed wire or reticulated bottom 18 is disposed within the frame 15 and seats upon the continuous flange 17, and the margin of the screen bottom 18 is tucked within the pocket between the reflexed portion 16 and body of the frame 15, whereby said bottom is securely held in place. The upper edge of the frame 15 is also preferably reflexed or bent back inwardly as at 19, for stiffening it, and the frame is tapered slightly from its lower to its upper edge, whereby a number of the holders may be stacked one upon the other, the lower edge of each upper frame fitting over the upper edge of the underlying frame with the flange 17 seating upon the upper edge of the lower frame. This will hold the holders in assembled relation. The lower edge of the holder, when the holder is applied to the tester to seat thereon, overlaps the frame 1, while the flange 17 seats upon the top plate 4. This prevents the displacement of the holder from the tester or candler, and provides a compact and effective arrangement.

The holder is provided between its ends with a transverse partition 20, to divide the holder into two compartments, the partition 20 having its ends disposed between pairs of cleats 21 secured to the longitudinal side members of the frame 15. The upper and lower edges of the partition 20 are also grooved and receive transverse rods 22 terminally engaged through the side member 15, said rods 22 being held in place in any suitable manner. Ordinary cardboard fillers 23 are disposed within the two compartments of the holder, to provide cells for receiving the eggs, these cells being disposed above the respective apertures 5 to hold the eggs thereabove.

The egg holder is adapted to hold a layer of eggs disposed in rows, and enables the eggs to be placed simultaneously upon the tester or candler to be held in proper position thereon. The holder may be used for shipping the eggs also, so as to act as a crate or carrier.

In operation, supposing the holder to be applied to the tester or candler with the eggs in the cells of the fillers 23, the eggs will be held above the apertures 5. Then, by swinging the handle 14, the reflector 7 will be moved longitudinally under the rows of eggs in succession, so that the light rays which pass upwardly through the apertures 5 will effectively illuminate the eggs so that the unfertile or bad eggs can be detected and removed. The reflector 7 reflects the light rays in an effective manner upwardly against the top plate 4 so that the light rays will pass through the apertures 5. The reflector can be moved quickly from one end of the frame to the other, so that the testing or candling operation does not consume but a few moments. The arc of movement of the upper free end of the arm 11 extends to the ends of the frame 1 and lies completely below the plate 4, whereby when the arm is swung back and forth, it can move the reflector from one end of the frame to the other.

When one set of eggs is tested, the holder is removed and replaced by another holder, it being noted that a number of the holders can be stacked conveniently.

Having thus described the invention, what is claimed as new is:

1. An egg candler embodying a frame having an opaque top plate provided with apertures, and a holder embodying a frame having its lower edge fitted over the upper edge of the aforesaid frame and having a meshed wire bottom upon said top plate.

2. An egg candler embodying a frame having an opaque top plate provided with apertures, a source of light within said frame, and a holder embodying a frame having its lower edge fitted over the upper edge of the aforesaid frame and provided with a reëntrant portion having a flange seating upon said top plate, said holder having a meshed wire bottom seating upon said flange and tucked between said reëntrant portion and body of the second mentioned frame.

3. An egg candler embodying means for supporting a plurality of eggs, and a source of light below said means movable to illuminate the eggs in succession.

4. An egg candler embodying egg holding means, a reflector movable therealong, and a source of light within said reflector, the reflector directing the rays of light toward the eggs.

5. An egg candler embodying egg holding means, rails extending along the same, a reflector movable along said rails, a source of light within the reflector, the reflector directing the rays of light toward said means, and means for moving the reflector along said rails.

6. An egg candler embodying a frame having an apertured top plate and a pair of rails therein, a reflector movable along said rails, and a source of light within said reflector, the reflector directing the rays of light upwardly.

7. An egg candler embodying a frame having an apertured top plate, a light reflector movable within the frame under said plate, and a source of light within the reflector, the reflector directing the rays of light upwardly through said apertured plate.

8. An egg candler embodying a frame having an apertured top plate and a pair of longitudinal rails therein at its sides, a transverse reflector having its ends engaging said rails, and a source of light carried by said reflector, the reflector directing the rays of light upwardly.

9. An egg candler embodying a frame having an apertured top plate and a pair of longitudinal rails at its sides, a transverse trough-shaped reflector having its ends engaging said rails, a source of light within the reflector, and means for moving the reflector longitudinally upon the rails.

10. An egg candler embodying a frame having an apertured top plate, legs supporting said frame, braces connecting said legs, the frame having longitudinal rails, a reflector carried by said rails, a source of light carried by the reflector, the reflector directing the rays of light upwardly, and a rock shaft carried by said braces and having an upwardly projecting arm connected to said reflector, whereby when said rock shaft is actuated, the reflector is moved longitudinally within said frame.

11. An egg candler embodying a rectangular frame having an apertured top plate, legs supporting said frame, braces attached to said legs, the frame having a pair of longitudinal rails at its sides, a transverse reflector between said rails, the reflector being of trough-shape and having portions at its ends seating upon said rails, a rock shaft carried by said braces and having an upwardly projecting arm provided with a T-head, and links connecting the ends of said T-head and reflector.

In testimony that we claim the foregoing as our own, we have hereto affixed our signatures in the presence of two witnesses.

LEWIS E. MILLER.
JOHN MORTON MILLER.
ARTHUR L. CARLTON.

Witnesses as to signature of Lewis E. Miller:
J. W. STARR,
T. WM. HILL.

Witnesses as to signature of John Morton Miller:
C. E. TINKER,
H. E. MOORE.

Witnesses as to signature of Arthur L. Carlton:
EDWIN B. TURNER,
EARLD BOYINGTON.

Copies of this patent may be obtained for five cents each, by addressing the "Commissioner of Patents, Washington, D. C."